(12) United States Patent
Huang et al.

(10) Patent No.: US 7,817,134 B2
(45) Date of Patent: Oct. 19, 2010

(54) POINTING DEVICE

(75) Inventors: Shih-Ching Huang, Kaohsiung County (TW); Sheng-Wen Jeng, Tainan (TW); Shun-Nan Liou, Kaohsiung (TW); Ming-Jye Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 854 days.

(21) Appl. No.: 11/641,657

(22) Filed: Dec. 20, 2006

(65) Prior Publication Data

US 2008/0122787 A1   May 29, 2008

(30) Foreign Application Priority Data

Nov. 29, 2006   (TW) ............................... 95144109 A (51) Int. Cl.
*G06F 3/033*   (2006.01)
(52) U.S. Cl. .................. 345/158; 345/156; 345/157; 345/163; 463/37
(58) Field of Classification Search ......... 345/156–179; 463/37–38; 348/734
See application file for complete search history.

(56) References Cited

U.S. PATENT DOCUMENTS

| | | | | |
|---|---|---|---|---|
| 4,493,992 A | * | 1/1985 | Geller ........................ 250/221 |
| 4,787,051 A | * | 11/1988 | Olson ......................... 345/179 |
| 4,839,838 A | * | 6/1989 | LaBiche et al. ............. 708/141 |
| 4,922,444 A | | 5/1990 | Baba .......................... 702/150 |
| 5,128,671 A | | 7/1992 | Thomas, Jr. .................. 341/20 |
| 5,181,181 A | * | 1/1993 | Glynn ......................... 702/141 |
| 5,440,326 A | | 8/1995 | Quinn ........................ 345/156 |
| 5,594,169 A | | 1/1997 | Field et al. ................. 73/504.14 |
| 5,825,350 A | * | 10/1998 | Case et al. .................. 345/163 |
| 5,835,077 A | | 11/1998 | Dao et al. .................... 345/157 |
| 5,874,941 A | | 2/1999 | Yamada ....................... 345/157 |
| 5,898,421 A | | 4/1999 | Quinn ......................... 345/156 |

(Continued)

FOREIGN PATENT DOCUMENTS

EP   1677178 A1 *  7/2006

(Continued)

*Primary Examiner*—Lun-Yi Lao
*Assistant Examiner*—Gregory J Tryder
(74) *Attorney, Agent, or Firm*—WPAT, PC; Justin King (57) ABSTRACT

A pointing device is disclosed in the present invention, which comprises a planar sensing unit, an inertial sensing unit and a controller unit. The planar sensing unit is capable of detecting a movement of the point device moving on a planar surface and generating a planar sensing signal accordingly. The inertial sensing unit is capable of detecting a movement of the point device while it is moving in a free space and thus generating an inertial sensing signal accordingly. The controller unit is coupled to the planar sensing unit and the inertial sensing unit for enabling the same to receive and process the planar sensing signal and the inertial sensing signal. In a preferred aspect, the planar sensing unit is capable of detecting and determining whether the pointing device is operating on a surface or in a free space for selectively enabling the pointing device to operate in a mode of two-dimensional detection or in a mode of three-dimensional detection such that users can apply the pointing device freely without being restricted by a surface or a space, and thus not only the usage convenience of the pointing device is enhanced, but also the applications thereof are broadened.

12 Claims, 10 Drawing Sheets

U.S. PATENT DOCUMENTS

| | | | |
|---|---|---|---|
| 5,963,195 A | 10/1999 | Gregg et al. | 345/159 |
| 6,115,028 A * | 9/2000 | Balakrishnan et al. | 345/157 |
| 6,181,329 B1 | 1/2001 | Stork et al. | 345/179 |
| 6,211,821 B1 | 4/2001 | Ford | 342/357.11 |
| 6,211,861 B1 | 4/2001 | Rosenberg et al. | 345/163 |
| 6,342,878 B1 * | 1/2002 | Chevassus et al. | 345/158 |
| 6,641,482 B2 | 11/2003 | Masuyama et al. | 463/44 |
| 6,834,528 B2 | 12/2004 | Kappi et al. | 73/1.75 |
| 6,897,854 B2 | 5/2005 | Cho et al. | 345/179 |
| 6,908,386 B2 | 6/2005 | Suzuki et al. | 463/30 |
| 6,995,744 B1 | 2/2006 | Moore et al. | 345/156 |
| 7,006,074 B2 * | 2/2006 | Chesters | 345/156 |
| 7,061,468 B2 * | 6/2006 | Tiphane et al. | 345/158 |
| 7,489,299 B2 * | 2/2009 | Liberty et al. | 345/163 |
| 2002/0060663 A1 * | 5/2002 | Wang | 345/156 |
| 2003/0016417 A1 * | 1/2003 | Lee | 359/142 |
| 2005/0022039 A1 * | 1/2005 | Inui et al. | 713/300 |
| 2005/0212767 A1 * | 9/2005 | Marvit et al. | 345/158 |
| 2005/0243061 A1 | 11/2005 | Liberty et al. | 345/158 |
| 2006/0164393 A1 | 7/2006 | Wu et al. | |
| 2006/0256085 A1 * | 11/2006 | Tsai et al. | 345/163 |

FOREIGN PATENT DOCUMENTS

| | | |
|---|---|---|
| JP | 6007371 B | 1/1994 |
| JP | 8123611 A | 5/1996 |
| TW | 526975 U | 4/2003 |
| TW | 594553 B | 6/2004 |
| TW | 220141 B | 8/2004 |
| TW | 246586 B | 1/2006 |
| WO | 2004/099903 A3 | 11/2004 |

* cited by examiner

POINTING DEVICE

FIELD OF THE INVENTION

The present invention relates to a pointing device, and more particularly, to a versatile pointing device integrating a planar sensing unit and an inertial sensing unit.

BACKGROUND OF THE INVENTION

With the rapid development and popularization of computers, more and more attention had been paid to the development of more user-friendly human-machine interface for facilitating the applications of computers. Currently, in addition to keyboards, there are many kinds of pointing devices, such as computer mouse and trackball, being adopted as a means to communicate with computers.

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. However, since the aforesaid mice are constrained to use on a surface, that is, they are only capable of detecting and defining two-dimensional movements, they can no longer meet the requirements of today's video games and multimedia applications, which desire to have a pointing device capable of producing three-dimensional output. Therefore, most manufactures are focusing there research on developing a pointing device with two-dimensional and three-dimensional detection ability.

One such research is a pointing device disclosed in U.S. Pat. No. 5,825,350, entitled "Electronic Pointing Apparatus and Method". The foregoing pointing apparatus is capable of controlling cursor movement and selecting elements on a computer screen no matter it is being held to move on a surface or in a free space, in which two gyroscopic elements are provided for indicating yaw and pitch movements of the pointing apparatus in free space, and a mouse ball and relating mouse ball encoders are provided for indicating movement of the pointing apparatus on a surface. Although the aforesaid pointing apparatus is operable no matter it is being held to move on a surface or in a free space, it still has following shortcomings: (1) the mouse ball, being the moving part of such pointing apparatus, can become dirty or be affected by dust, damaging the sensitivity of the pointing apparatus. (2) The use of the two pricey gyroscopic elements will cause the manufacturing cost of the pointing apparatus to increase.

One another such research is a spatial input apparatus disclosed in U.S. Pat. No. 4,839,838. The aforesaid spatial input apparatus including a series of coplanar, single axis accelerometers configured to provide information on translation along and rotation around a set of orthogonal axes. However, as the angular velocity variation relating to a movement of the spatial input apparatus is detected by the series of accelerometers and determined by a differential operation that the accuracy of the detection as well as the differential operation are not quite satisfactory, the sensitivity of the spatial input apparatus is questionable.

Therefore, it is in need of a pointing device that is accurate and convenience to operate no matter it is being held to move on a surface or in a free space.

SUMMARY OF THE INVENTION

It is the primary object of the present invention to provide a pointing device integrating a planar sensing unit and an inertial sensing unit that is capable of detecting and determining whether the pointing device is operating on a surface or in a free space for selectively enabling the pointing device to operate in a mode of two-dimensional detection or in a mode of three-dimensional detection.

It is another object of the invention to provide a pointing device, being a device integrating a planar sensing unit and an inertial sensing unit, whose manufacturing cost is comparatively lower than prior-art pointing devices.

Yet, another object of the invention is to provide a versatile pointing device having an inertial sensing unit composed of a plural gyroscopic elements and a plural accelerometers, by which users can apply the pointing device freely without being restricted by a surface or a space, and thus not only the usage convenience of the pointing device is enhanced, but also the applications thereof are broadened.

To achieve the above objects, the present invention provides a pointing device, comprising: a planar sensing unit, capable of detecting a movement of the point device moving on a planar surface and generating a planar sensing signal accordingly; an inertial sensing unit, capable of detecting a movement of the point device while it is moving in a free space and thus generating an inertial sensing signal accordingly; and a controller unit, coupled to the planar sensing unit and the inertial sensing unit for enabling the same to receive and process the planar sensing signal and the inertial sensing signal.

Preferably, the controller unit is connected to an interface unit while the interface unit is further being coupled to the planar sensing unit and the inertial sensing unit and used for converting the planar sensing signal and the inertial sensing signal received thereby into a digital signal to be processed by the controller unit and formed a displacement signal accordingly. In addition, the controller unit is further coupled to an output unit for outputting the displacement signal therefrom to an electronic device, such as a game console, a computer, a multimedia apparatus and other digital apparatuses.

Preferably, the planar sensing unit can be a device selected from the group consisting of a trackball encoder and an optical sensor; and correspondingly, the planar sensing signal can be a signal selected from the group consisting of a pulse signal and an optical signal.

Moreover, to achieve the above objects, the present invention further provides a pointing device, comprising: a planar sensing unit, capable of detecting a movement of the point device moving on a planar surface and generating a planar sensing signal accordingly; a gyroscopic element, capable of detecting and measuring a angular velocity of the pointing device and generating a first sensing signal accordingly; an acceleration sensing part, capable of detecting and measuring an acceleration measured along at least an axis of a set of orthogonal axes of a space and generating a second sensing signal accordingly; and a controller unit, coupled to the planar sensing unit, the gyroscopic element and the acceleration sensing part for enabling the same to receive and process the planar sensing signal, the first sensing signal, and the second sensing signal.

In a preferred aspect, the acceleration sensing part is composed of: a first accelerometer, for detecting an acceleration measured along a second axis of a set of orthogonal axes while the pointing device is being held to move in a space defined by the set of orthogonal axes and an inclination signal of the pointing device while the pointing device is being held to rotate about a first axis of the set of orthogonal axes in the space; and a second accelerometer, for detecting an acceleration measured along the first axis while the pointing device is being held to move in the space and an inclination signal of the pointing device while the pointing device is being held to rotate about the second axis. Moreover, the pointing device further comprises a switch control, used for controlling the controller unit to receive a signal selected from the group consisting of the first sensing signal of the gyroscopic element and the inclination signal detected by the second accelerometer.

In another preferred aspect, the acceleration sensing part is composed of: a first accelerometer, for detecting an acceleration measured along a second axis of a set of orthogonal axes while the pointing device is being held to move in a space defined by the set of orthogonal axes and an inclination signal of the pointing device while the pointing device is being held to rotate about a first axis of the set of orthogonal axes in the space; and a second accelerometer, for detecting an acceleration measured along the first axis while the pointing device is being held to move in the space and an inclination signal of the pointing device while the pointing device is being held to rotate about the second axis; and a third accelerometer, for detecting an overturn status of the pointing device.

Preferably, the planar sensing unit is capable of generating a return signal used for enabling the controller unit to switch between a mode of two-dimensional detection and a mode of three-dimensional detection.

Preferably, the controller unit is connected to an interface unit while the interface unit is further being coupled to the planar sensing unit, the gyroscopic element and the acceleration sensing part to be used for converting the planar sensing signal, the first and the second sensing signals received thereby into a digital signal to be processed by the controller unit and formed a displacement signal accordingly. In addition, the controller unit is further coupled to an output unit for outputting the displacement signal therefrom to an electronic device.

Furthermore, to achieve the above objects, the present invention further provides a pointing device, comprising: a planar sensing unit, capable of detecting a movement of the point device moving on a planar surface and generating a planar sensing signal accordingly; a first accelerometer, for detecting an acceleration measured along a second axis of a set of orthogonal axes while the pointing device is being held to move in a space defined by the set of orthogonal axes and an inclination signal of the pointing device while the pointing device is being held to rotate about a first axis of the set of orthogonal axes in the space; a second accelerometer, for detecting an acceleration measured along the first axis while the pointing device is being held to move in the space and an inclination signal of the pointing device while the pointing device is being held to rotate about the second axis; a third accelerometer, for detecting an overturn status of the pointing device and generating a third sensing signal accordingly; and a controller unit, coupled to the planar sensing unit, the first, the second and the third accelerometers for enabling the same to receive and process the planar sensing signal, the first, the second and the third sensing signals.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
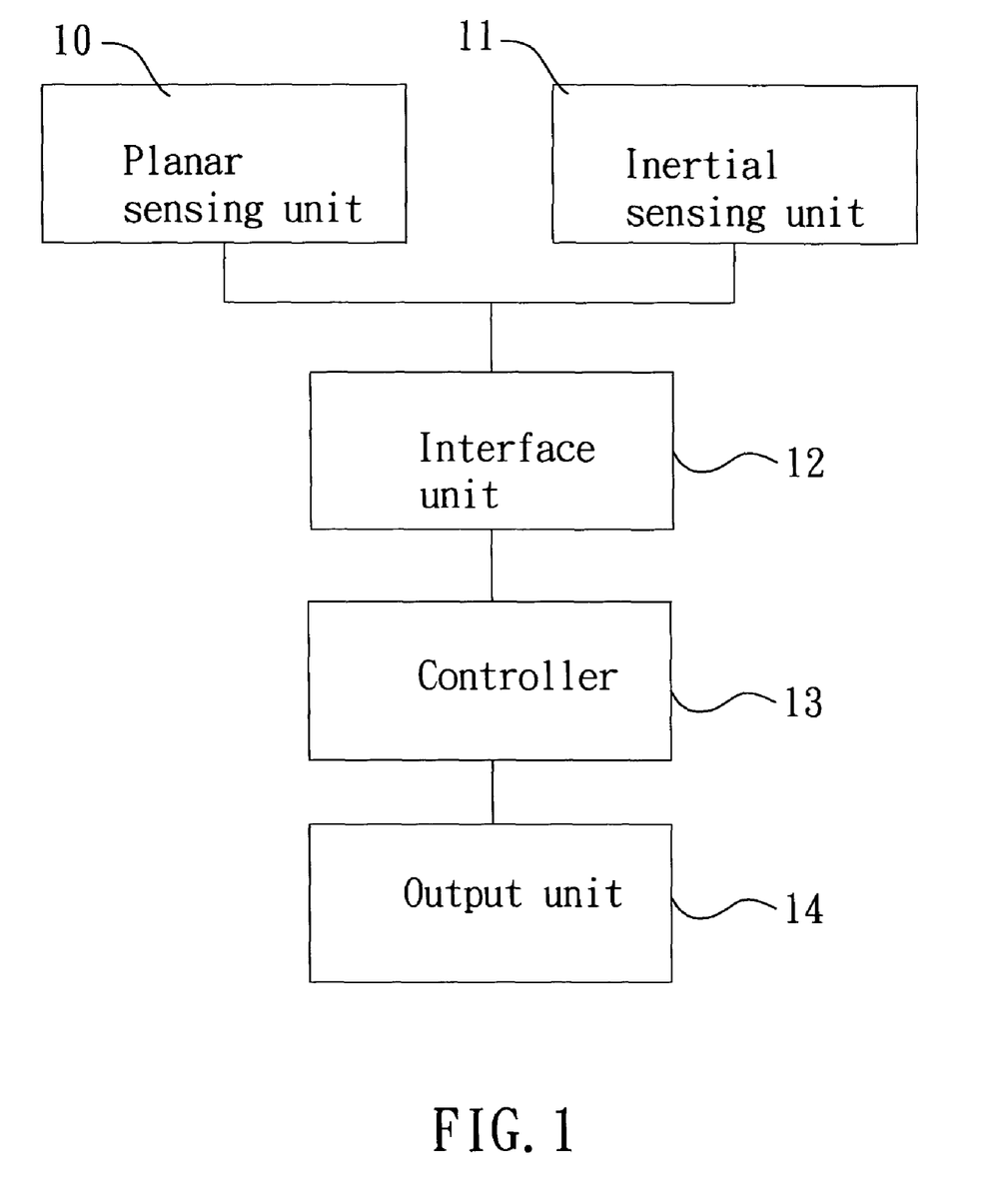
FIG. 1 is a block diagram depicting a pointing device of the invention.

Please refer to FIG. 1, which is a block diagram depicting a pointing device of the invention. As seen in FIG. 1, the pointing device is capable of sensing and measuring a motion of acceleration while it is being held to move on a surface or in a space by the cooperative operation of a planar sensing unit 10, an inertial sensing unit 11, and interface unit, and a controller unit 13, in which the interface unit 12 is used for converting signals sensed by the planar sensing unit 10 and the inertial sensing unit 11 into a digital signal and sending the digital signal to the controller unit 13; the controller unit 13 is used for processing the digital signal and thus generating a displacement signal accordingly; and the output unit 14, coupled to the controller unit 13, is used for outputting the displacement signal to an electronic device for enabling a character or a cursor displayed on a display of the electronic device to move accordingly. It is noted that the inertial sensing unit 11 is capable if generating an inertial sensing signal with respect to the motion of the pointing device, whereas the inertial sensing signal can be an acceleration signal or an angular velocity signal; and further, the electronic device can be a game console, a computer, or a multimedia apparatus, etc. In a preferred aspect, the planar sensing unit 10 is capable of generating a return signal used for enabling the controller unit 13 to switch between a mode of two-dimensional detection and a mode of three-dimensional detection.

Figure 2:
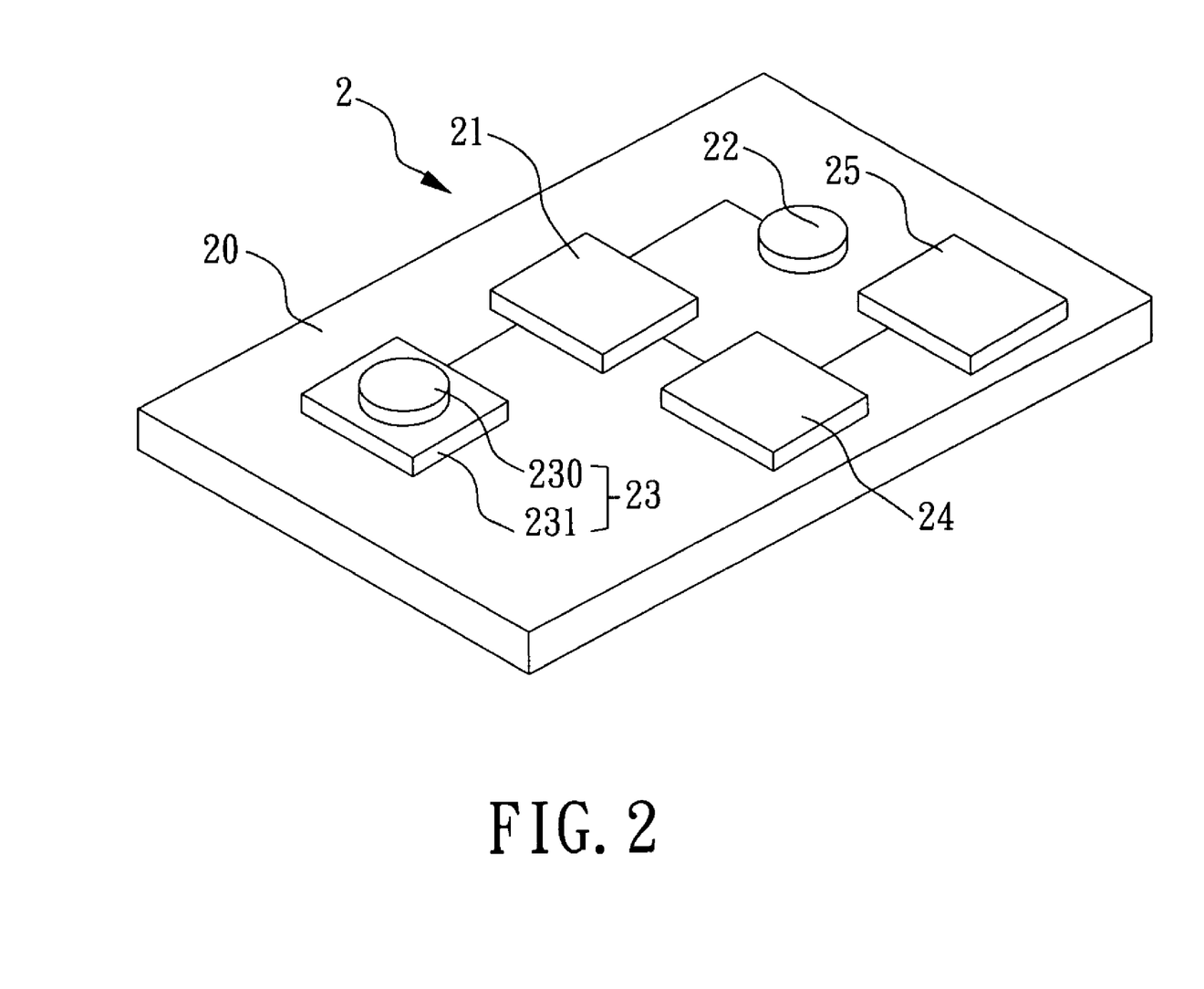
FIG. 2 is a schematic view of a pointing device according to a first preferred embodiment of the invention.

Please refer to FIG. 2, which is a schematic view of a pointing device according to a first preferred embodiment of the invention. The pointing device 2 is comprised of an interface unit 21, a planar sensing unit 22, an inertial sensing unit 23 and a controller unit 24. The interface unit 21 is arranged on a circuit board 20 while being enabled to couple to the planar sensing unit 22 and the inertial sensing unit 23. The planar sensing unit 22 is used for detecting a movement of the point device while it is held to move on a planar surface, and thus generating a planar sensing signal accordingly. In a preferred aspect, the planar sensing unit 22 is a device selected from the group consisting of a trackball encoder and an optical sensor; and correspondingly, the planar sensing signal is a signal selected from the group consisting of a pulse signal and an optical signal. It is noted that the planar sensing unit 22 is a common unit used in those prior-art pointing device and thus is not described further herein.

Figure 3:
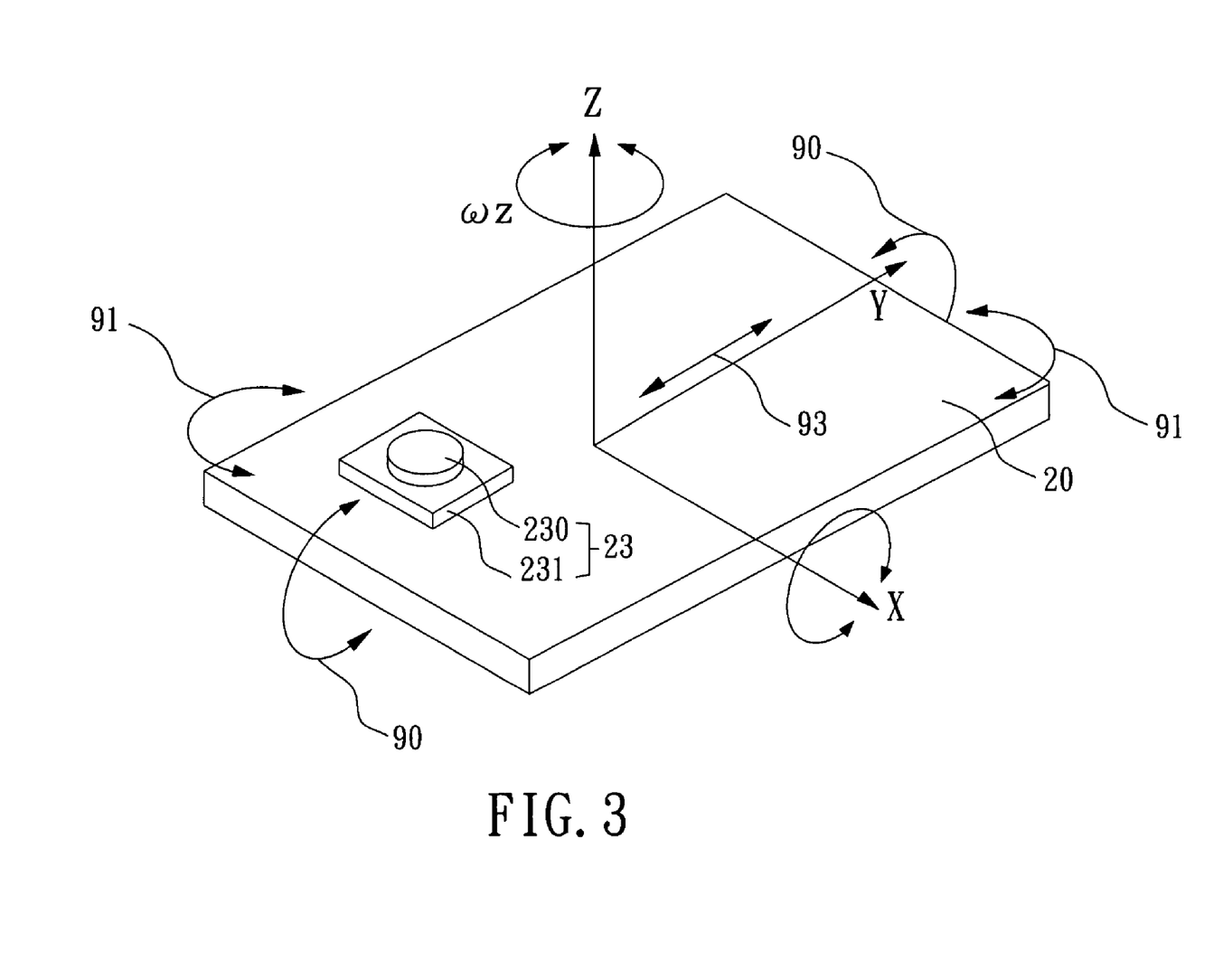
FIG. 3 shows the pointing device of FIG. 2 as it is in operation for detecting a motion.

The inertial sensing unit 23 is used for detecting a movement of the point device 2 while it is being held to move in a free space and thus generating an inertial sensing signal accordingly. In this preferred embodiment, the inertial sensing unit 23 is composed of a gyroscopic element 230 and an acceleration sensing part 231 comprising an accelerometer. Operationally, as seen in FIG. 3, the yawing of the pointing device 2, indicated by the double-headed arrow 91, is detected by the gyroscopic element 230 that the yawing status $\omega_z$ of the pointing device 2 can be measured by the gyroscopic element 230 as it is being held to rotate about the Z-axis of a free space defined by a set of orthogonal X-, Y-, and Z-axis; the acceleration of a planar movement of the pointing device 2, indicated by the double-headed arrow 93, as well as the pitching, indicated by the double-headed arrow 90, is detected by an accelerometer of the acceleration sensing part 231 that the acceleration of the pointing device 2 measured along the Y-axis and the inclination of the pointing device 2 with respect to the. X-axis can be measured. As the pointing device 2 is pitching, indicated by the double-headed arrow 90, the accelerometer of the acceleration sensing part 231 is enabled to measure the variation of included angle of gravity with respect to the pitching of the pointing device 2 so as to evaluate the inclination status of the pointing device 2 and thus control the vertical movement of a cursor displayed on a display of the electronic device.

As the yawing, status $\omega_z$ of the pointing device 2 is measured by the gyroscopic element 230 as it is being held to rotate about the Z-axis, the gyroscopic element 230 will correspondingly generate a first rotation signal; and as the pitching 90 of the pointing device 2 is detected and the inclination of the pointing device 2 with respect to the X-axis is measured by the accelerometer of the acceleration sensing part 231, the accelerometer of the acceleration sensing part 231 will correspondingly generate a second rotation signal. Referring to FIG. 2, as soon as the first and the second rotation signals are received by the interface unit 21, it will process the received signals for generating a corresponding digital signal accordingly and sending the digital signal to the controller unit 24 where it is processed and converted into a displacement signal to be outputted by the output unit 25 to an electronic device for controlling the displacement of a cursor or object displayed on a display of the electronic device. In a preferred aspect, the first rotation signal is used for controlling the horizontal movement of the cursor/object displayed in the display while the second rotation signal is used for controlling the vertical movement of the cursor/object, such that the digital signal integrating the first and the second rotation signal can control the cursor/object to move all over the display of the electronic device.

The planar sensing unit 22, being an optical sensor as in one preferred embodiment of the invention, can be used for determining whether the pointing device 2 is being held to move and operate on a planar surface or in a free space. Since the planar sensing unit 22, as being an optical sensor, is able to detect light reflected from a planar surface while using the reflected light for motion detection, the planar sensing unit 22 will determine that the pointing device 2 is operating on a planar surface when there is reflected light to be sensed thereby; otherwise, it will determine that the pointing device is being held in a free space. Thus, the planar sensing unit 22 is capable of generating a return signal used for enabling the controller unit 24 to switch between a mode of two-dimensional detection and a mode of three-dimensional detection.

Figure 4A:
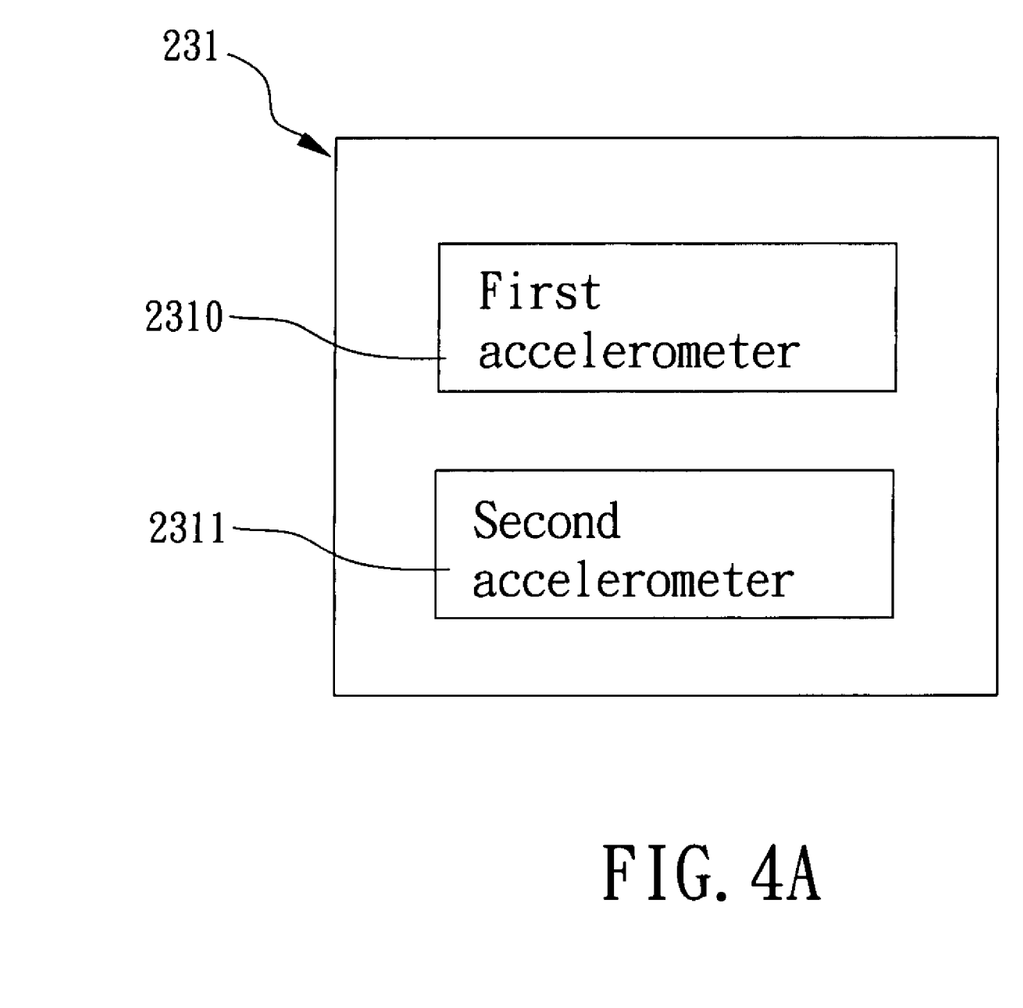
FIG. 4A shows an acceleration sensing part according to a preferred embodiment of the invention.
Figure 4B:
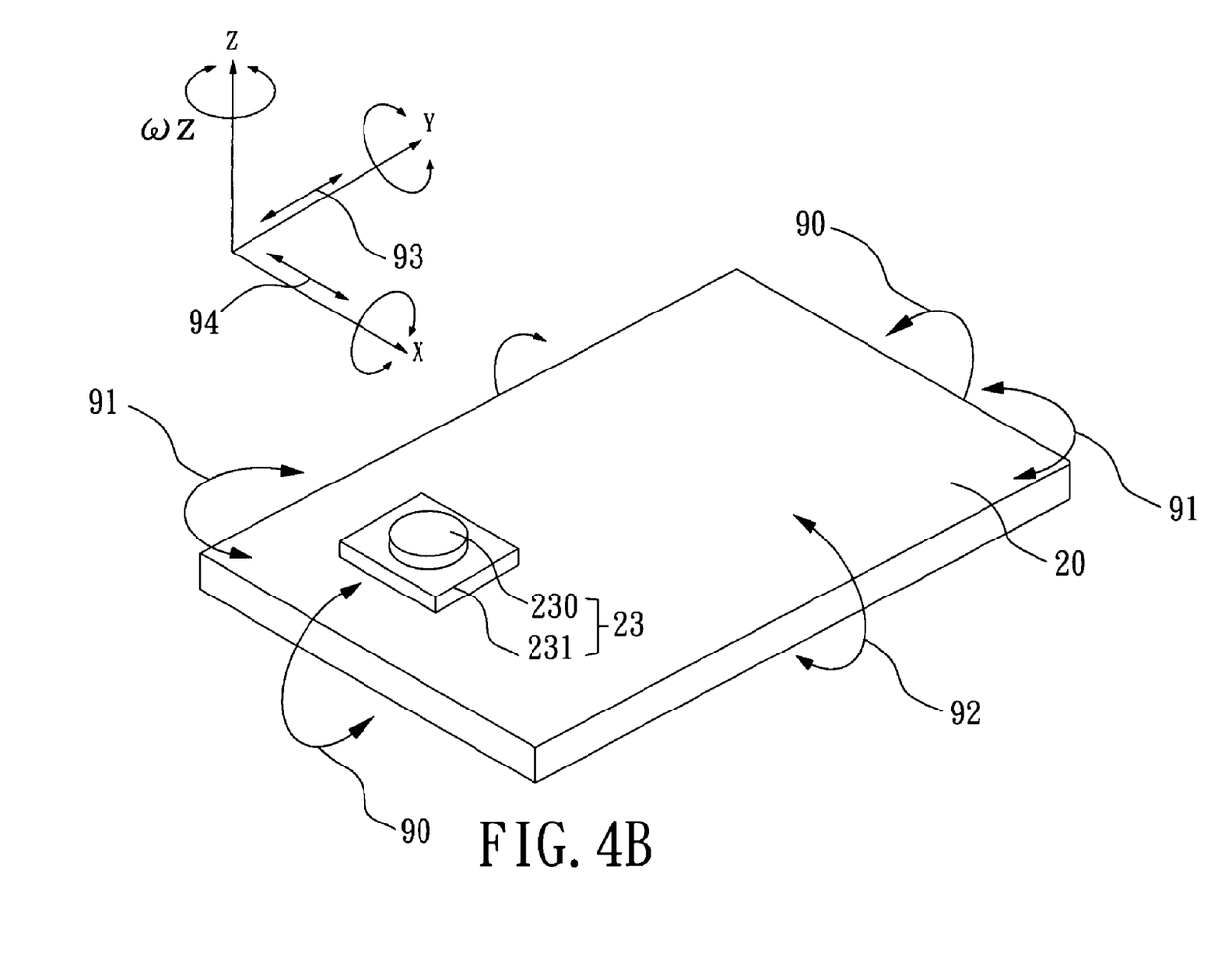
FIG. 4B shows a pointing device according to a second preferred embodiment as it is in operation for detecting a motion.

Please refer to FIG. 4A, which shows an acceleration sensing part according to a preferred embodiment of the invention. In FIG. 4A, the acceleration sensing part 231 includes a first accelerometer 2310 and a second accelerometer 2311 in which the working of the first accelerometer 2310 is the same as the aforesaid accelerometer and is not described further herein. Operationally, as seen in FIG. 4B, the acceleration of a planar movement of the pointing device 2, indicated by the double-headed arrow 94, as well as the rolling, indicated by the double-headed arrow 92, can be detected by the second accelerometer 2311 that the acceleration of the pointing device 2 measured along the X-axis and the inclination of the pointing device 2 with respect to the Y-axis can be measured. Hence, the second accelerometer 2311 is functioning similar to the gyroscopic element 230, that the second accelerometer 2311 is enabled to measure the variation of included angle of gravity with respect to the rolling of the pointing device 2 so as to evaluate the inclination status of the pointing device 2 and thus control the horizontal movement of a cursor displayed on a display of the electronic device. In this preferred embodiment, a switch control is further configured in the pointing device 2, which can be used for selectively controlling the controller unit 24 to received signal from the gyroscopic element 230 or the second accelerometer 2311.

By configuring both the gyroscopic element 230 and the second accelerometer 2311 in the pointing device 2, the application of the pointing device 2 can be broadened. Although the function of the gyroscopic element 230 and the second accelerometer 2311 are similar, the addition of the second accelerometer 2311 can enable the pointing device 2 to detect one more movement as indicated by the double-headed arrow 92, i.e. the rolling of the pointing device 2, and thus the variation of motion of the object/cursor controlled by the pointing device 2 is increased.

Figure 5A:
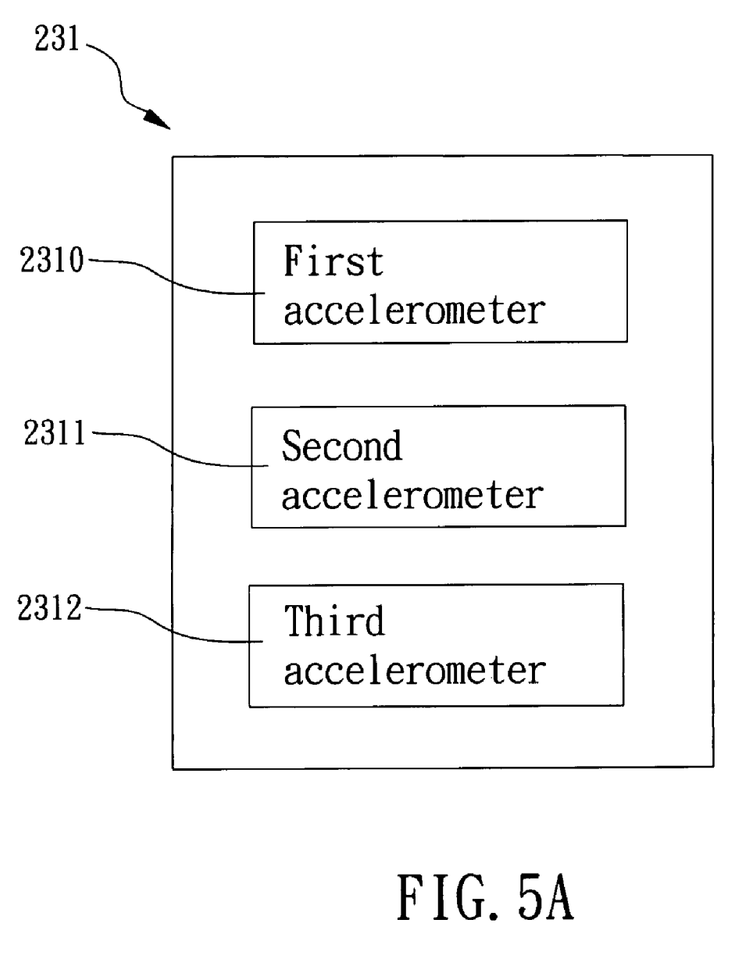
FIG. 5A shows an acceleration sensing part according to another preferred embodiment of the invention.

Please refer to FIG. 5A, which shows an acceleration sensing part according to another preferred embodiment of the invention. In this preferred embodiment, the acceleration sensing part 231 includes a first accelerometer 2310, a second accelerometer 2311, and a third accelerometer 2312, in which the working of the first accelerometer 2310 and the second accelerometer 2311 are the same as the aforesaid accelerometers and is not described further herein. Operationally, as seen in FIG. 5B and FIG. 5C, the two diagonal-rollings of the pointing device 2, indicated by the two double-headed arrows 95, 96, can be detected by the third accelerometer 2312 that the inclination of the pointing device 2 with respect to the Z-axis can be measured, i.e. the overturn status of the pointing device 2 is measured.

Figure 5B:
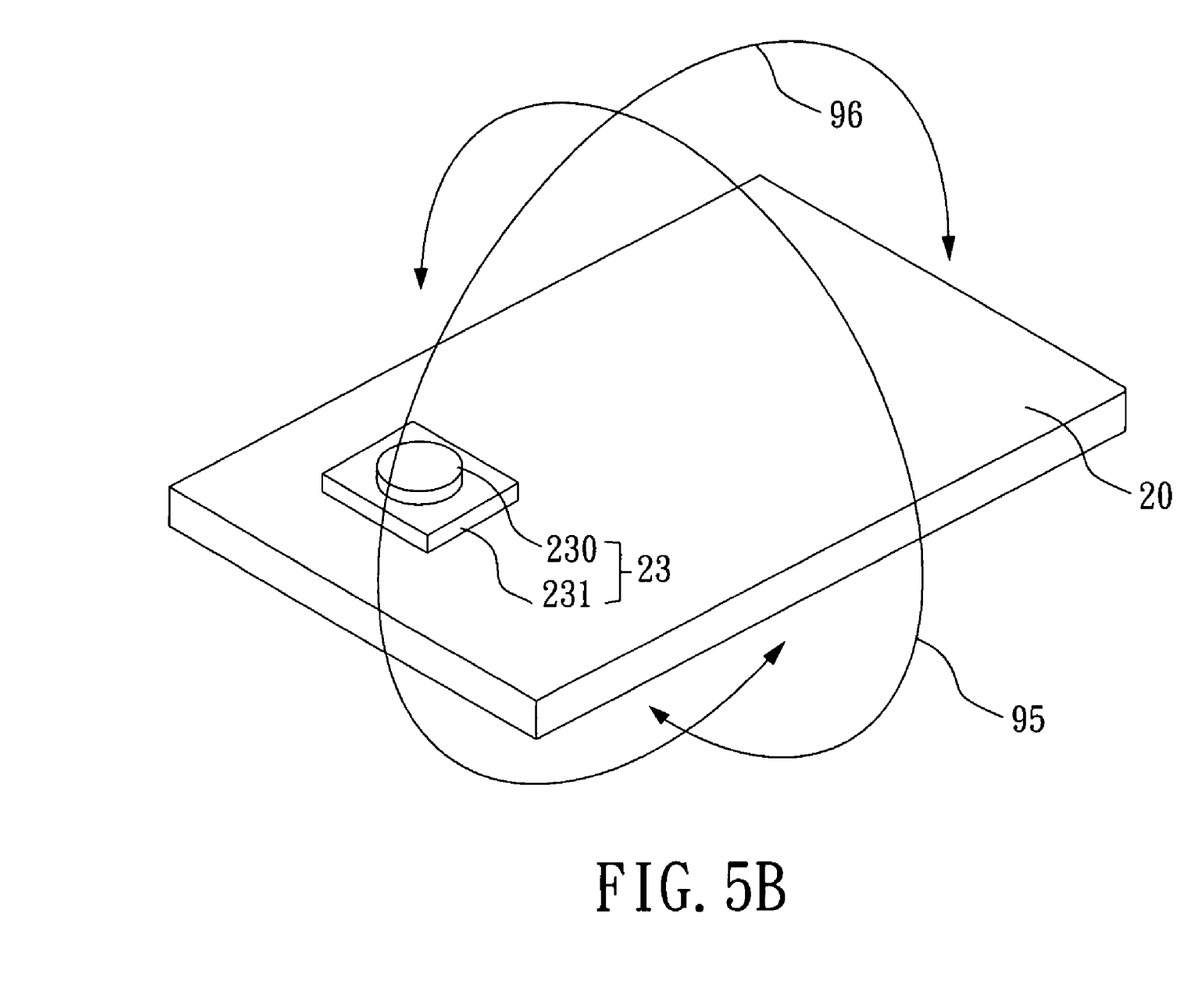
FIG. 5B shows the acceleration sensing part of FIG. 5A as it rotates.
Figure 5C:
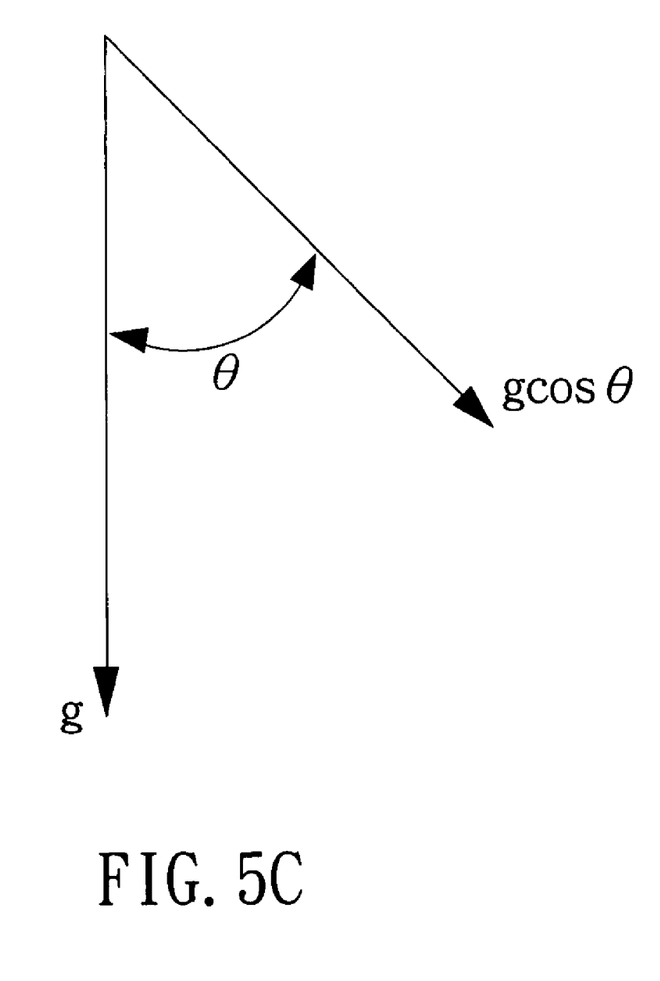
FIG. 5C shows the influence of gravity exerting on the acceleration sensing part of FIG. 5A as it rotates.

As seen in FIG. 5B and FIG. 5C, when the pointing device 2 is overturning as indicated by the two arrows 95, 96, a component of gravity will effect on the third accelerometer 2312. As the instance shown in FIG. 5C, when the overturned pointing device achieves an included angle θ between the oneself and gravity g, a gravity component g cos θ will effect upon the third accelerometer 2312 and thus enable the same to generate a corresponding signal to be received and processed by he controller unit 24. In addition, the third accelerometer 2312 is capable of generating a return signal used for enabling the controller unit to switch between a mode of two-dimensional detection and a mode of three-dimensional detection. Therefore, the addition of the third accelerometer 2312 can enable the pointing device 2 to detect one more movement as indicated by the two double-headed arrows 95, 96, i.e. the diagonal-rolling of the pointing device 2, and thus the variation of motion of the object/cursor controlled by the pointing device 2 is further increased.

Figure 6A:
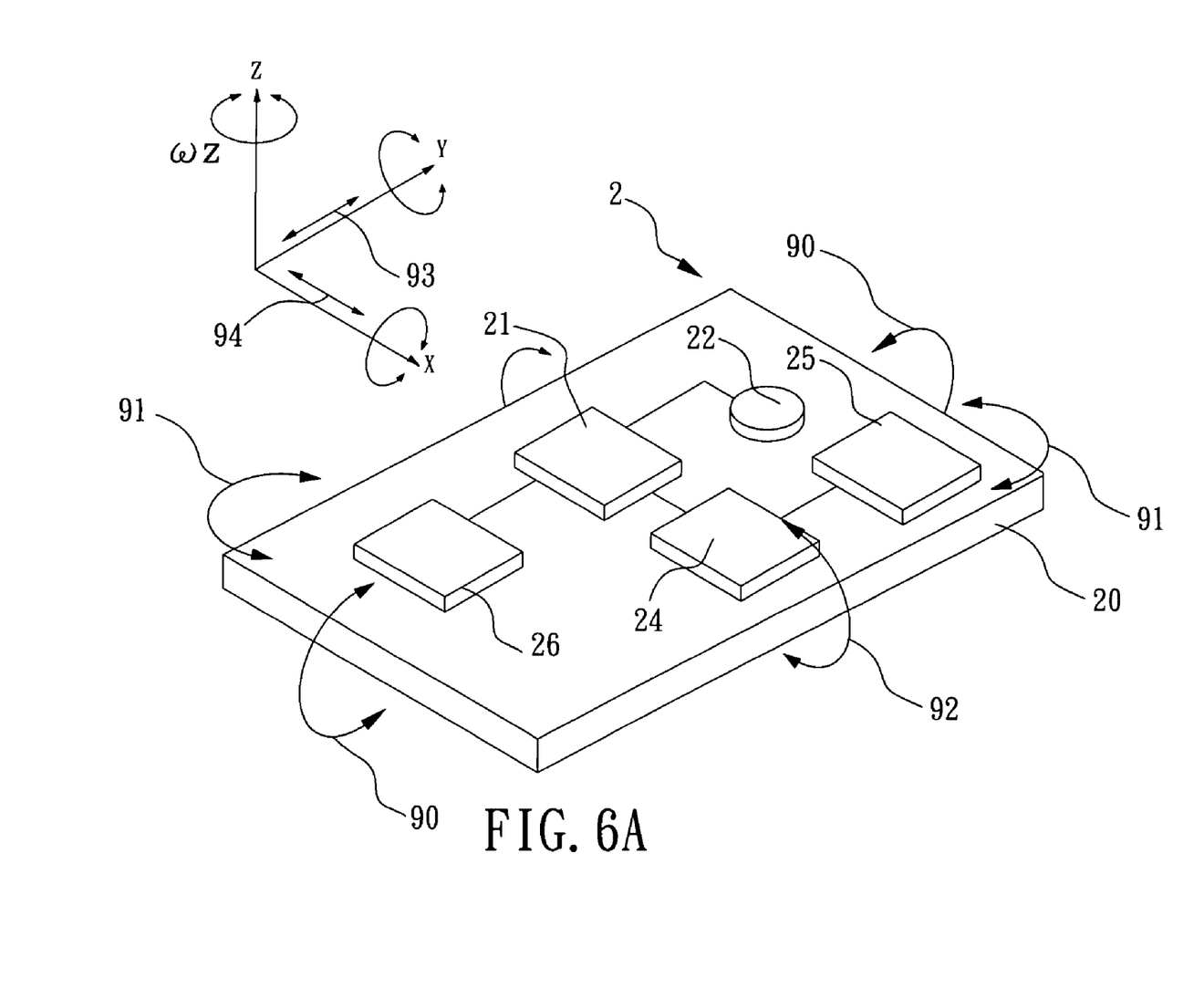
FIG. 6A is a schematic view of a pointing device according to a third preferred embodiment of the invention as it is in operation for detecting a motion.
Figure 6B:
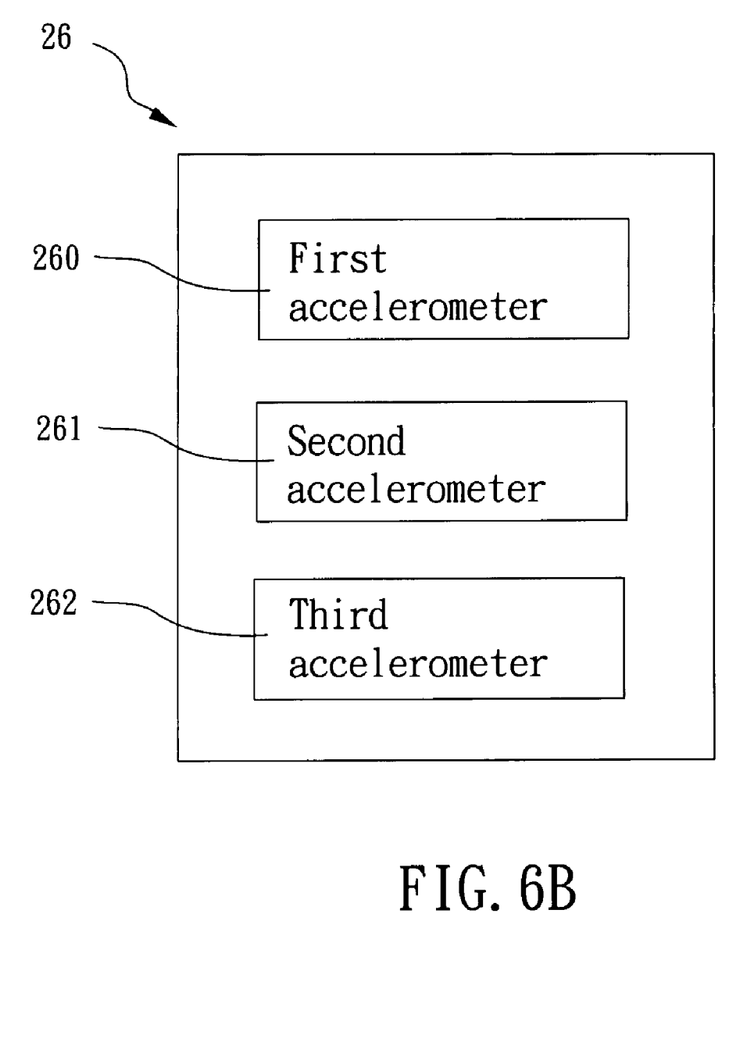
FIG. 6B shows an acceleration sensing part used in the pointing device of FIG. 6A.

Please refer to FIG. 6A and FIG. 6B, which are respectively a schematic view of a pointing device according to a third preferred embodiment of the invention as it is in operation for detecting a motion and an acceleration sensing part used in the pointing device of FIG. 6A. In this preferred embodiment, the pointing device 2 is comprised of an interface unit 21, a planar sensing unit 22, an acceleration sensing unit 26 and a controller unit 24 and an output unit 25, in which the functions of the controller unit 24 and the output unit 25 are the same as those described hereinbefore and thus are not further described herein. As seen in FIG. 6B, the acceleration sensing unit 26 includes a first accelerometer 260, a second accelerometer 261, and a third accelerometer 262. Operationally, as seen in. FIG: 6A, the two planar motions of the pointing device 2, indicated by the two double-headed arrows 93, 94, can be detected by the first and the second accelerometers 260, 261 that the acceleration of the pointing device 2 moving on surface of XY-axes is measured.

When the pointing device 2 is being held to move and operate in a free space, the pitching, indicated by the double-headed arrow 90, is detected by the first accelerometer 260 that the inclination of the pointing device 2 with respect to the X-axis can be measured and thus a first sensing signal is generated by the first accelerometer 260 to be sent to and processed by the interface unit 21, the controller unit 24 and the output unit 25 and used for controlling the vertical movement of an object/cursor displayed on a display of an electronic device. In addition, the rolling of the point device 2, indicated by the double-headed arrow 92, can be detected by the second accelerometer 261 while enabling the same to measure an included angle formed between the rolling pointing device 2 and the gravity, so that the inclination of the pointing device 2 with respect to the Y-axis can be measured and thus a second sensing signal is generated by the second accelerometer 2610 to be sent to and processed by the interface unit 21, the controller unit 24 and the output unit 25 and used for controlling the horizontal movement of the object/cursor. Moreover, the overturn of the pointing device 2 can be detected by the third accelerometer 262 that are similar to that described with respect to FIG. 5C and this is not described further herein. In a preferred aspect, the third accelerometer 262 is capable of generating a return signal used for enabling the controller unit 24 to switch between a mode of two-dimensional detection and a mode of three-dimensional detection.

To sum up, the present invention provides a versatile pointing device having ability to switch between two-dimensional operation and three-dimensional operation mode automatically with respect to whether it is being held to move and operate on a planar surface or in a free space, by which users can apply the pointing device freely without being restricted by a surface or a space, and thus not only the usage convenience of the pointing device is enhanced, but also the applications thereof are broadened.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A pointing device, comprising:
a planar sensing unit, capable of detecting a movement of the pointing device moving on a planar surface, and generating a planar sensing signal accordingly;
a gyroscopic element, for detecting and measuring angular velocity of the pointing device when the pointing device is rotated with respect to an axis orthogonal to the planar surface, and generating a yaw signal accordingly;
a first accelerometer, for detecting and measuring pitch of the pointing device relative to the planar surface when the pointing device is rotated about a first axis in the planar surface with respect to a second axis in the planar surface orthogonal to the first axis, and generating a first inclination signal accordingly;
a second accelerometer, for detecting and measuring roll of the pointing device relative to the planar surface when the pointing device is rotated about the second axis in the planar surface with respect to the first axis, and generating a second inclination signal accordingly;
a third accelerometer, for detecting and measuring an overturn status of the pointing device, and generating a third inclination signal accordingly, wherein the third accelerometer generates a return signal used for enabling the controller unit to switch between a mode of two-dimensional detection and a mode of three-dimensional detection;
an inertial sensing unit comprising the gyroscopic element and the first accelerometer, capable of detecting a movement of the pointing device moving in free space by processing the angular momentum signal and the inclination signal, and generating an inertial sensing signal accordingly;
an interface unit, coupled to the planar sensing unit and the inertial sensing unit, converts the planar sensing signal and the yaw signal into a corresponding digital signal;
a controller unit, coupled to the interface unit, which processes and converts the digital signal into a corresponding displacement signal; and
an output unit, coupled to the controller unit, which processes and converts the displacement signal, providing signals to an electronic device for controlling the horizontal and vertical displacement of an object displayed on a display of the electronic device.

2. The pointing device of claim 1, further comprising:
a switch control, used for controlling the controller unit to receive a signal selected from the group consisting of the first inclination signal and the second inclination signal.

3. The pointing device of claim 1, further comprising:
wherein the inertial sensing unit further comprises the third accelerometer, for detecting and measuring an overturn status of the pointing device, and generating a third inclination signal accordingly.

4. The pointing device of claim 1, further comprising:
a switch control, used for controlling the controller unit to receive a signal selected from the group consisting of the first inclination signal, the second inclination signal, and the third inclination signal.

5. The pointing device of claim 1, wherein the planar sensing unit, being an optical sensor, is capable of generating a return signal used for enabling the controller unit to switch between a mode of two-dimensional detection and a mode of three-dimensional detection.

6. The pointing device of claim 1, wherein the electronic device the a device selected from the group consisting of a game console, a computer, a multimedia apparatus and other digital apparatuses.

7. The pointing device of claim 1, wherein the controller unit is further coupled to an output unit for outputting the displacement signal therefrom to an electronic device selected from the group consisting of a game console, a computer, and a multimedia apparatus.

8. The pointing device of claim 1, wherein the planar sensing unit is a device selected from the group consisting of a trackball encoder and an optical sensor; and correspondingly, the planar sensing signal is a signal selected from the group consisting of a pulse signal and an optical signal.

9. A pointing device, comprising:
a planar sensing unit, capable of detecting a movement of the pointing device moving on a planar surface and generating a planar sensing signal accordingly;
a first accelerometer, for detecting movement of the pointing device moving on a planar surface and generating an first inclination signal of the pointing device while the pointing device is being held to rotate about a first axis of the set of orthogonal axes in the space for controlling a vertical movement of a cursor/object in a display;
a second accelerometer, for detecting movement of the pointing device moving on a planar surface and generating an second inclination signal of the pointing device while the pointing device is being held to rotate about a second axis of the set of orthogonal axes in the space for controlling a horizontal movement of the cursor/object; and
a third accelerometer, for detecting an overturn status of the pointing device and generating an overturn sensing signal accordingly, wherein the third accelerometer generates a return signal used for enabling the controller unit to switch between a mode of two-dimensional detection and a mode of three-dimensional detection;
an interface unit, coupled to the planar sensing unit and the first, second, and third accelerometers, for converting the planar sensing signal, the first and second inclination signals, and the overturn sensing signal into a corresponding digital signal; and
a controller unit, coupled to the interface unit, the planar sensing unit, the first, the second, and the third accelerometers, for enabling the same to receive and process the planar sensing signal, the first inclination signal, the second inclination signal and the sensing signals, and which processes and converts the digital signal into a corresponding displacement signal; and
an output unit, coupled to the controller unit, which processes and converts the displacement signal, providing signals to an electronic device for controlling the horizontal and vertical displacement of an object displayed on a display of the electronic device.

10. The pointing device of claim 9, wherein the planar sensing unit, being an optical sensor, is capable of generating a return signal used for enabling the controller unit to switch between a mode of two-dimensional detection and a mode of three-dimensional detection.

11. The pointing device of claim 9, wherein the planar sensing unit is a device selected from the group consisting of a trackball encoder and an optical sensor; and correspondingly, the planar sensing signal is a signal selected from the group consisting of a pulse signal and an optical signal.

12. The pointing device of claim 9, wherein the controller unit is further coupled to the output unit for outputting the displacement signal therefrom to an electronic device selected from the group consisting of a game console, a computer, and a multimedia apparatus.

\* \* \* \* \*